US009052062B2

(12) United States Patent
Schwarting et al.

(10) Patent No.: US 9,052,062 B2
(45) Date of Patent: Jun. 9, 2015

(54) FUEL TANK WITH SEPARATING MEMBRANE

(71) Applicant: Astrium GmbH, Taufkirchen (DE)

(72) Inventors: Walter Schwarting, Oldenburg (DE); Sylvain Goek, Bremen (DE)

(73) Assignee: Astrium GmbH, Taufkirchen (DE)

( * ) Notice: Subject to any disclaimer, the term of this patent is extended or adjusted under 35 U.S.C. 154(b) by 0 days.

(21) Appl. No.: 13/660,160

(22) Filed: Oct. 25, 2012

(65) Prior Publication Data

US 2013/0105490 A1 May 2, 2013

(30) Foreign Application Priority Data

Oct. 27, 2011 (DE) ......................... 10 2011 117 489

(51) Int. Cl.
*B65D 88/12* (2006.01)
*F17C 7/00* (2006.01)
(Continued)

(52) U.S. Cl.
CPC . *F17C 7/00* (2013.01); *B64G 1/402* (2013.01); *F17C 1/00* (2013.01); *F15B 1/125* (2013.01); *F17C 2201/0128* (2013.01); *F17C 2201/0185* (2013.01); *F17C 2201/056* (2013.01); *F17C 2223/0153* (2013.01); *F17C 2223/0161* (2013.01); *F17C 2223/035* (2013.01); *F17C 2227/0192* (2013.01); *F17C 2260/027* (2013.01);
(Continued)

(58) Field of Classification Search
CPC . B64G 1/402; F15B 1/125; F15B 2201/3151; C10B 24/16; E21B 2033/005; F16L 23/20; F05D 2240/58; B65D 2543/00972; B01D 53/228; F17C 1/00; F17C 7/00; F17C 2201/0128; F17C 2201/0185; F17C 2201/056; F17C 2223/0161; F17C 2223/0153; F17C 2223/035; F17C 2227/0192; F17C 2270/0189
USPC ............... 220/564, 560.08, 560.06, 500, 477; 206/508; 96/4, 5, 6, 14; 244/172.3, 244/172.2; 24/460, 462
See application file for complete search history.

(56) References Cited

U.S. PATENT DOCUMENTS 1,680,276 A * 8/1928 Andrus et al. ................ 428/594
1,965,418 A * 7/1934 La Bombard ................. 229/5.5
(Continued)

FOREIGN PATENT DOCUMENTS

DE 2102969 8/1972
DE 42 43 652 7/1993
(Continued)

OTHER PUBLICATIONS

European Search Report for European Application No. EP 12 00 6378, dated Aug. 12, 2013, 6 pages, Muenchen, Germany.
(Continued)

*Primary Examiner* — Andrew Perreault
*Assistant Examiner* — James M Van Buskirk
(74) *Attorney, Agent, or Firm* — W. F. Fasse

(57) ABSTRACT

A tank especially suitable for use as a fuel or oxidizer tank in spacecraft is divided into two tank spaces by a membrane. A liquid is stored on one side of the membrane and a pressure gas is stored on the other side of the membrane. The pressure gas is to drive the liquid out of the tank. The membrane is made of a polymer material and is held by a spring ring in a recess on the outer wall of the tank. The spring ring has a substantially C-shaped cross-section to exert elastic spring holding forces on the membrane in the recess.

20 Claims, 2 Drawing Sheets

(51) Int. Cl.
*B64G 1/40* (2006.01)
*F17C 1/00* (2006.01)
*F15B 1/12* (2006.01)

(52) U.S. Cl.
CPC ..... *F17C 2260/05* (2013.01); *F17C 2270/0131* (2013.01); *F17C 2270/0189* (2013.01); *F17C 2270/0194* (2013.01); *F17C 2221/08* (2013.01); *F17C 2270/0197* (2013.01)

(56) References Cited

U.S. PATENT DOCUMENTS

| | | | | |
|---|---|---|---|---|
| 1,976,343 | A * | 10/1934 | Heineman | 219/100 |
| 3,085,708 | A * | 4/1963 | Dosker | 220/560.06 |
| 3,803,671 | A * | 4/1974 | Stuppy et al. | 24/460 |
| 3,943,873 | A * | 3/1976 | Hering et al. | 114/125 |
| 4,107,826 | A * | 8/1978 | Tysdal | 24/460 |
| 4,489,745 | A * | 12/1984 | Netter et al. | 137/209 |
| 4,718,571 | A * | 1/1988 | Bordner | 220/270 |
| 5,201,431 | A * | 4/1993 | Berger et al. | 215/386 |
| 5,622,280 | A * | 4/1997 | Mays et al. | 220/614 |
| 5,961,074 | A * | 10/1999 | Dunn | 244/135 R |
| 6,129,236 | A | 10/2000 | Osokin et al. | |
| 6,231,008 | B1 | 5/2001 | Schwarting | |
| 6,745,983 | B2 * | 6/2004 | Taylor | 244/135 R |
| 7,241,531 | B2 * | 7/2007 | Dahlberg | 429/163 |
| 8,418,726 | B2 | 4/2013 | Baltes et al. | |
| 2009/0168442 | A1 * | 7/2009 | Chen | 362/500 |
| 2011/0186580 | A1 * | 8/2011 | Joh et al. | 220/560.06 |

FOREIGN PATENT DOCUMENTS

| | | |
|---|---|---|
| DE | 198 10 638 | 6/1999 |
| DE | 102007003724 | 7/2008 |
| EP | 1 031 729 | 8/2000 |
| FR | 2092208 | 1/1971 |
| GB | 702518 | 1/1954 |

OTHER PUBLICATIONS

European Search Report for European Application No. EP 12 00 6378, dated Aug. 12, 2013, 6 pages, Munich, Germany.

* cited by examiner

FUEL TANK WITH SEPARATING MEMBRANE

PRIORITY CLAIM

This application is based on and claims the priority under 35 USC 119 of German Patent Application DE 10 2011 117 489.7, filed on 27 Oct. 2011, the entire disclosure of which is incorporated herein by reference.

FIELD OF THE INVENTION

The invention relates to a fuel tank for the storage of liquids, which are driven out of the tank by a pressure gas, especially for use in spacecraft. The tank is constructed as a membrane tank and in which the membrane consists of a synthetic material.

BACKGROUND INFORMATION

Membrane tanks are preferably used as containers for the storage of liquids, especially for the storage of fuels, which are impinged upon and pressurized by a pressure gas that is separated from the respective liquid by a separating membrane in the tank. Such uses typically arise in space travel under conditions of weightlessness, but also under gravity, for example in rapidly or strongly position-variable systems, such as aircraft or submarines. While the outer shape of such tanks is mostly embodied as a sphere, the membrane located in the interior of these tanks is usually a half-spherical shaped body, which is equatorially clamped to the tank along the circumferential rim of the membrane.

The membranes used in such tanks mostly consist of chemically compatible elastomer material. The elastomeric membrane must be held without relaxation, i.e. without loss of its elastic characteristic, in a durable leak-tight manner in the equatorial clamping arrangement of the tank. The main part of the tank volume within the half-spherical volume of the membrane is liquid-filled, while a small part of the tank volume, namely that outside of the membrane, is filled with the pressure gas, whereby the gas pressurizes the entire tank interior by pressing against the membrane and thereby pressurizing the liquid on the liquid side of the membrane.

For a liquid removal, that is to say for emptying the tank, an increased gas pressure is needed for driving out the liquid against the flow resistance imposed by the system as well as against the internal pressure of the downstream system. This purpose is served by a pressure reservoir on the pressure gas side, which can be arranged either within or outside of the tank. The required tank pressure can either be taken out in the relaxation or slackening mode, the so-called "blow-down" mode, can be established and regulated via a constant pressure regulator in the case of an external gas tank.

With increasing removal of liquid, an inversion process of the membrane through its equatorial plane takes place, all the way until the total emptying of the entire tank volume. In contrast to plastic polymer membranes, elastomer membranes withstand such inversion processes without the formation of rips or tears and leaks caused thereby. However, elastomer membrane materials having a sufficient compatibility with the liquids used in space flight are not available, because such liquids are chemically very aggressive, such as the oxidizer types based on nitrogen dioxide. Thus, elastomer membranes are not suitable for membrane tanks for use in space flight systems. Rather, all chemically compatible synthetic material membranes suitable for the oxidizer types used for space flight belong to the material class of the perfluoro polymers. These, however, are of a plastic nature, and as plastic materials are not suitable for a direct clamping-in inside the tank, because they lack an inherent durable stable resilient restoring force.

The mechanical problems arising in the use of plastic polymer materials for tank separating membranes are as follows:

1.) tear formation during the inversion process,

2.) permeation and leaking through pores, especially with thin-walled materials, 3.) creeping under the influence of pressure forces with the result of an attachment that is not durably secure over time, and a merely temporary leak-tightness of the membrane clamping arrangement.

While the first two problems can be regarded as already having been solved in the known tanks that are being used today, the problem of the creeping of the membrane at the clamping arrangement has previously still not been satisfactorily solved. While elastic membrane materials, due to their elastic resilient restoring forces, can be fixed and sealed by a clamping arrangement in a metallic surrounding, for plastic materials an elastic surrounding for the clamping and sealing function is previously not known. This elastic characteristic of the clamping surrounding must be able to compensate the creeping of a plastic polymer material and therewith a mechanical loosening as well as a possible loss of seal-tightness. For maintaining the clamping and sealing characteristics in the long term, thus for the entire time duration of a mission or some other application, it is decisively important that at the end of the creeping of the polymer, a stable force equilibrium arises between the spring forces of the clamping arrangement and the active resilient restoring forces of the membrane. This must be ensured above all, also under the influence of a chemically aggressive environment and especially in connection with a swelling due to the influence of fuels, with simultaneously arising alternating loads due to positive and negative temperature changes as well as by variations of the tank pressure, which can have an influence on the tension of the clamping arrangement.

SUMMARY OF THE INVENTION

In view of the above it is an object of the invention to further develop a fuel tank of the above general type, so that the membrane thereof suffers neither problems resulting from the aggressiveness of the liquid stored in the tank nor mechanical problems caused by a creeping of the membrane. The invention especially aims to provide an improved clamping arrangement by which various suitable membrane materials can be effectively and durably be clamped and sealed. The invention further aims to avoid or overcome the disadvantages of the prior art and to achieve additional advantages as apparent from the present specification. The attainment of these objects is, however, not a required limitation of the claimed invention.

The above objects have been achieved according to the invention, in a membrane-separated tank for storing a liquid, wherein the membrane is made of a polymer material and is mounted or held in a sealed manner by a spring ring, which has a substantially "C"-shaped cross-section, in a recess of the outer wall of the tank as a counter support.

An inventive embodiment of a liquid storage tank for use in spacecraft comprises a tank wall, a membrane of a synthetic polymer material, and a spring ring. The tank wall encloses a tank space therein and has a recess on an inner wall surface thereof. The membrane is arranged in the tank space so as to divide the tank space into a liquid space and a gas space respectively on opposite sides of the membrane. The spring ring has a substantially C-shaped cross-section and is arranged to clampingly hold a portion of the membrane in a sealed manner in the recess on the inner wall surface of the tank wall.

Further it is suggested in a preferred embodiment that the membrane comprises a looping or wrapping angle of at least 180° around the spring ring in the holding or clamping area in the recess.

In an advantageous further development of the tank according to another embodiment of the invention, it is provided that the spring constant and the diameter of the spring ring are dimensioned in adaptation to the permanent remaining deformation of the polymer material of the membrane.

The alloy of which the inventively provided ring consists is preferably advantageously selected so that the ring is absolutely chemically compatible with the tank contents. In this regard, the material selection is oriented to the list of metals that have been tested for compatibility with the respective utilized fuel or oxidizer.

In order to prevent the membrane from slipping out of the recess, or especially out of the clamped gap between the spring ring and the walls of the recess, as a result of mechanical loading, it is preferably provided that the surface of the spring ring is roughened.

Alternatively, it is suggested that the spring ring is preferably provided with a coating based on the compatible perfluoro synthetic materials and is fixed with the membrane by gluing or vulcanizing via the coating.

The invention offers the advantage that due to very high chemical compatibility of the separating membrane, a universal tank design is provided, with a suitability both for fuels as well as for the nitrogen dioxide based oxidizers typically used in binary or two component propulsion systems, but also for diverse other aggressive liquids.

BRIEF DESCRIPTION OF THE DRAWINGS

In order that the invention may be clearly understood, it will now be described in connection with an example embodiment thereof, with reference to the drawings, wherein.

Figure 1:
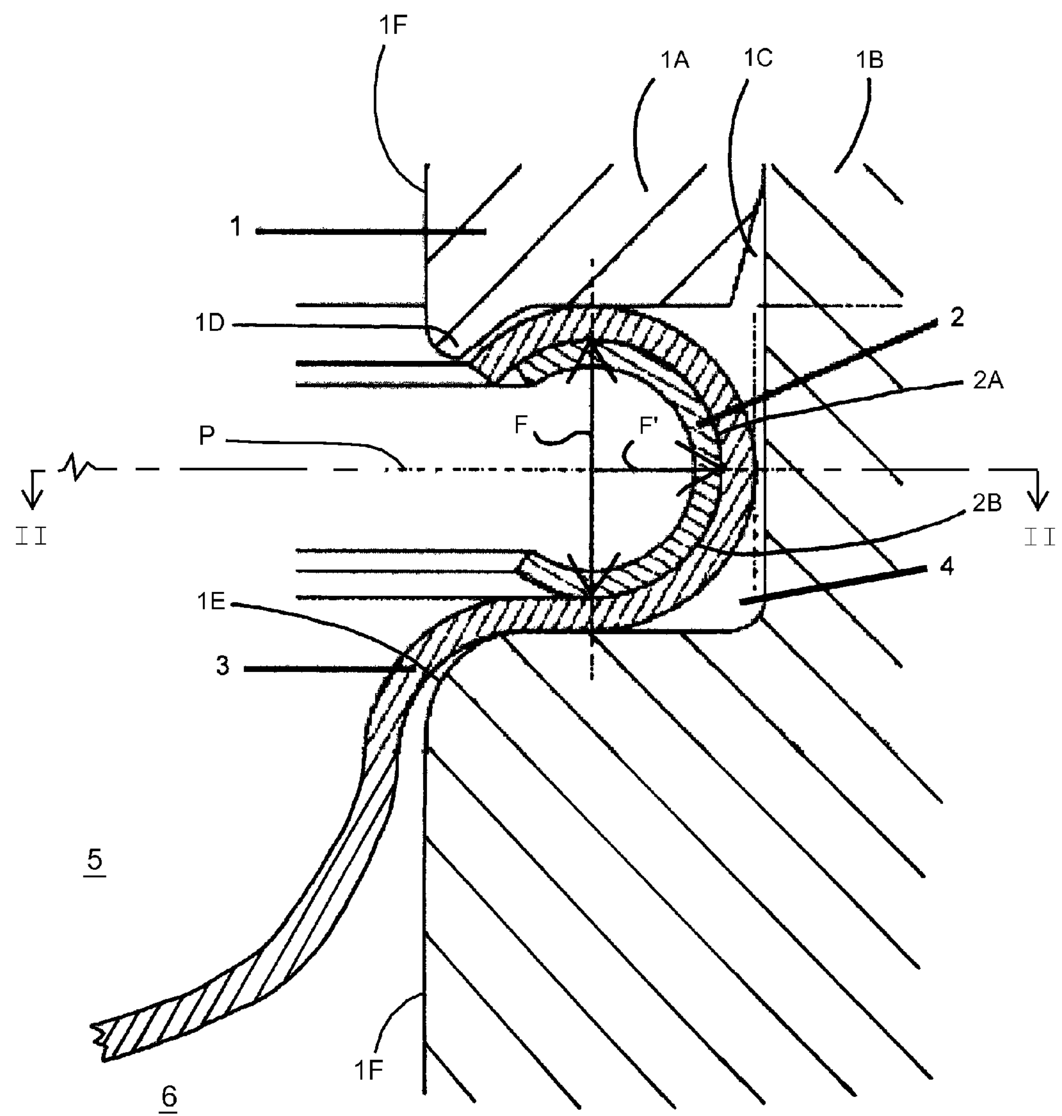
FIG. 1 shows a sectional view of a small portion of a wall of a tank according to the invention, at the area of a spring ring clamping an edge rim of a membrane into a recess in the tank wall, as indicated by the section line I-I in FIG. 2.

DETAILED DESCRIPTION OF A PREFERRED EXAMPLE EMBODIMENT AND OF THE BEST MODE OF THE INVENTION

In the following, an arrangement according to the invention will be described in more detail in connection with a schematically illustrated example embodiment.

In a partially sectioned illustration, a tank wall 1 is illustrated, with a polymer membrane 3 clamped into a corresponding recess 4 of a tank wall 1 by a spring ring 2, which comprises a cross-section in the shape of a "C". The spring ring 2 is preferably made of a metal alloy that has an elastic spring characteristic. Especially when the spring ring 2 is to be exposed to the rocket fuel or oxidizer liquid in the liquid space 5 on one side of the membrane 3, then the spring ring 2 is preferably made of a metal alloy material that is chemically compatible with or inert and resistant to the chemical composition of the rocket fuel or oxidizer.

Figure 2:
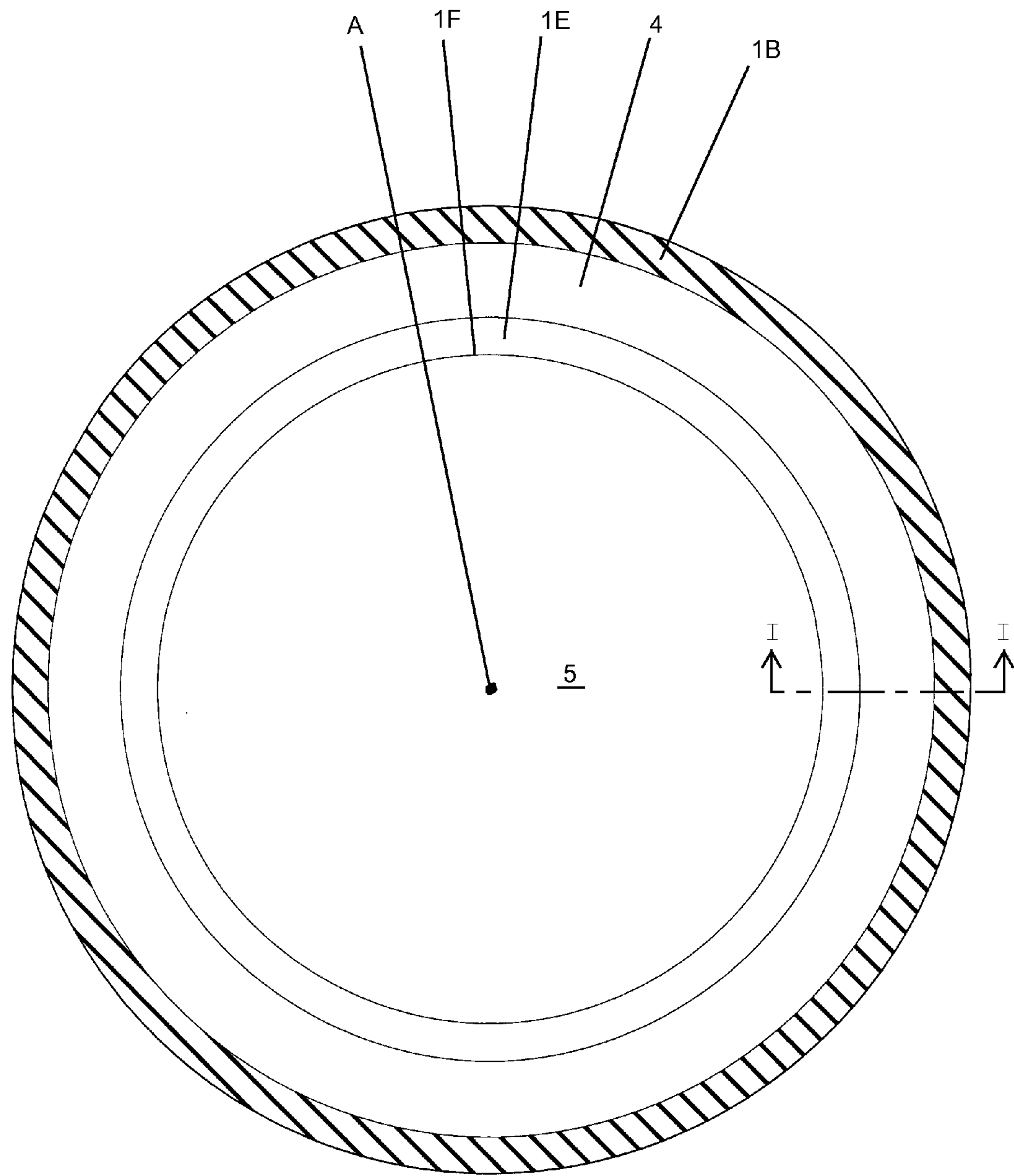
FIG. 2 schematically shows (not to scale) a sectional view of the wall of the tank on the section line II-II on plane P in FIG. 1, showing the recess in the wall, from which the spring ring and membrane have been omitted for clarity and simplicity.

The C-shape of the spring ring 2 refers to the sectional shape of the spring ring as shown in FIG. 1 on a section plane along section line I-I of FIG. 2. But in the view direction of FIG. 2 perpendicular to the view direction of the drawing FIG. 1 (e.g. on a plane P perpendicular to the section plane of FIG. 1, as seen along a vertical central axis A of the tank) the spring ring 2 may be configured as a complete continuous closed circle or as a split ring i.e. a split circle to better allow a radial compression and a radial outward expansion thereof relative to the vertical central axis A for snapping outwardly into the recess 4. As shown in FIG. 2, the recess 4 extends circumferentially around the inner wall surface 1F of the tank wall 1 along a first plane P (see FIG. 1) on which the tank wall 1 is circular.

Because a plastic polymer body, due to its natural material characteristics, cannot be clamped into a rigid surrounding, for example of metal, without this clamped connection becoming loose and un-sealed over the course of time due to creep processes, therefore, as illustrated, the plastic polymer membrane 3, which comprises no inherent resilient restoring force, is clamped tight by means of the spring ring 2 which exerts a spring tension against the edge rim of the membrane 3 in the recess 4 of the tank wall 1.

The design or selection of all of the forces taking part both in the clamping as well as in the static friction serves to achieve a permanent holding force and seal tightness.

In further detail, the metal tank wall 1 is preferably constructed of a first tank part 1A and a second tank part 1B that are joined to one another at a seam 1C, which extends into the recess 4 provided on the inner wall surface 1F of the tank wall 1. For example, this seam 1C and the recess 4 are provided generally at the equatorial plane P of the tank. An outer circumferential edge rim portion of the polymer membrane 3 is at least partially wrapped around the outer surface of the spring ring 2, and this assembly is press-fit into the recess 4. The components are dimensioned so that the spring ring 2, in its illustrated installed condition, is slightly elastically compressed in the vertical direction as shown in the drawing of FIG. 1, so that the resilient restoring force F of the substantially C-shaped spring ring cross-section tightly and sealingly presses the edge rim portion of the polymer membrane 3 against the inner surfaces of the recess 4. Additionally, in the installed condition, the entire spring ring 2 may be slightly compressed radially inwardly relative to a vertical central axis A of the tank and the spring ring, such that the spring ring 2 also exerts a lateral or radial outward force F' to press the edge rim portion of the polymer membrane 3 into the recess 4 and laterally or radially outwardly against the lateral outer wall of the recess 4. This provides at least three sealing contact areas of the polymer membrane 3 pressed against the surfaces of the recess 4.

Thereby, the inner wall surface 1F of the tank wall 1 bounds a tank inner space, and the membrane 3 divides the tank inner space into a liquid side 5 on one side of the membrane 3 and a gas side 6 on the other side of the membrane 3. The liquid-tight and pressure-tight seal provided by the edge rim portion of the membrane 3 pressed into the recess 4 seals the two spaces 5 and 6 from each other and prevents leakage therebetween. Furthermore, because the tank seam 1C extends into the recess 4, the edge rim portion of the membrane 3 pressed and sealed into the recess 4 additionally provides a seal against leakage out of the tank through the seam 1C. The pressure within the tank also acts outwardly on the inside of the C-shaped cross-section of the spring ring 2 and thereby further helps to press and seal the edge rim portion of the membrane 3 into the recess 4.

In the illustrated example embodiment, the recess 4 has a substantially square cross-sectional shape in the view of FIG. 1 with one arcuate rounded edge 1E and one protruding nose edge 1D that forms a narrower throat of the recess 4 in that the recess is undercut behind the protruding nose edge 1D. Thereby, when the arrangement of the spring ring 2 and the edge rim portion of the membrane 3 is pressed outwardly into the recess 4, it snaps into the recess 4 via a temporary compression of the open C-shaped cross-section of the spring ring 2 as it passes through the narrower throat of the recess 4 into the enlarged undercut portion of the recess 4 behind the protruding nose edge 1D. This helps to positively retain the spring ring 2 and the outer edge rim portion of the membrane 3 clamped in the recess 4, by a positive mechanical form-fitting or form-locking snap-fit connection. The rounded edge 1E is provided on the side of the recess 4 at which the membrane 3 enters into the recess 4. Thereby, the rounded edge 1E avoids pinching, chafing or cutting the membrane 3 as might occur with a square edge or other sharp-cornered edge of the recess 4. As the tank transitions through different filling states of the liquid, the membrane 3 moves progressively from the gas side 6 to the liquid side 5 as the liquid is withdrawn from the tank. During this motion of the membrane 3, the membrane can smoothly "roll" along the rounded edge 1E of the recess 4 without suffering any wear at this location. Preferably, the rounded edge 1E has a radius of curvature similar to an inner radius of the C-shaped cross-section of the spring ring 2, and for example may especially have a radius that is within +/−25% of being the same as the inner radius of the C-shaped cross-section.

The spring ring 2 is made of a metal with an elastic yielding spring characteristic that provides a restoring force when it is elastically compressed. The material characteristics and the dimensions of the spring ring 2 are selected in consideration of the material characteristics of the polymer material of the membrane 3, especially the long term creep characteristics, such that the pressing forces F and FT exerted by the spring ring 2 on the edge rim portion of the polymer membrane 3 into the recess 4 will be maintained long term or permanently.

The substantially C-shape of the spring ring 2 follows a circular arc curvature over an angular range of more than 180°, or especially from 220° to 270°, and preferably from 250° to 260°. The polymer membrane 3 wraps around the spring ring 2 with a wrapping angle of at least 180° and preferably at least 220°.

The outer edge rim portion of the membrane 3 may be held into the recess 4 simply by friction and the snap-fit of the spring ring 2 applying the outward pressing forces F and F'. Additionally, a roughened surface 2A can be provided on the outer surface of the spring ring 2 in order to enhance the frictional engagement of the membrane 3 on the spring ring 2. As a further alternative, a coating 2B such as an adhesive coating or a vulcanizable rubber or polymer coating can be provided on the outer surface of the spring ring 2, such that the outer edge rim portion of the membrane 3 is positively joined to the spring ring 2 by adhesive bonding or vulcanizing of the coating 2B.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A liquid storage tank for a spacecraft comprising:

a tank wall that encloses a tank space therein and that has a recess on an inner wall surface thereof bounding said tank space, wherein said recess extends circumferentially around said inner wall surface of said tank wall along a first plane on which said tank wall is circular;

a membrane of a synthetic polymer material arranged in said tank space so as to divide said tank space into a liquid space and a gas space respectively on opposite sides of said membrane; and a spring ring that has a ring shape on said first plane, and that is made of a spring metal with a spring characteristic, and that has a substantially C-shaped cross-section on a section plane perpendicular to said first plane, wherein said spring ring is received in said recess and clampingly holds a membrane portion of said membrane in a liquid-tight and pressure-tight sealed manner in said recess with said membrane portion clampingly held between said spring ring and an inner surface of said recess, wherein an open side of said C-shaped cross-section of said spring ring faces inwardly into said tank space.

2. The liquid storage tank according to claim 1, wherein said membrane portion wraps around said spring ring with a wrapping angle of at least 180° in said recess.

3. The liquid storage tank according to claim 2, wherein said wrapping angle is at least 220°.

4. The liquid storage tank according to claim 1, wherein said membrane portion is a circumferential edge rim of said membrane.

5. The liquid storage tank according to claim 1, wherein said spring ring is configured as a complete circular ring on said first plane, which is an equatorial plane of said tank.

6. The liquid storage tank according to claim 1, wherein said substantially C-shaped cross-section has a circular curvature over an arc of 220° to 270°.

7. The liquid storage tank according to claim 1, wherein said recess has a substantially square cross-section.

8. The liquid storage tank according to claim 1, wherein said inner wall surface of said tank wall adjoins said recess along two edges of said recess, a first one of said edges is a rounded edge that transitions smoothly and roundly from said inner wall into said recess, and a second one of said edges is a protruding nose edge with said recess partially undercut therebehind.

9. The liquid storage tank according to claim 8, wherein said membrane extends into said recess between said rounded edge of said recess and said substantially C-shaped cross-section of said spring ring.

10. The liquid storage tank according to claim 1, wherein said tank wall comprises two wall parts that are joined to one another along a seam, and said seam extends into said recess circumferentially around said tank wall.

11. The liquid storage tank according to claim 1, wherein said spring metal of said spring ring on an inner side of said C-shaped cross-section is exposed through said open side to said liquid space.

12. The liquid storage tank according to claim 1, wherein said spring ring is exposed to said liquid space.

13. The liquid storage tank according to claim 1, further comprising a liquid rocket fuel or a liquid rocket combustion oxidizer contained in said liquid space, and a pressurizing gas contained in said gas space, and wherein introduction of said pressurizing gas under pressure into said gas space pressurizes said tank space, drives said liquid rocket fuel or liquid rocket combustion oxidizer out of said liquid space and out of said tank, and causes said membrane to move and invert from said gas space toward said liquid space while enlarging said gas space and diminishing said liquid space.

14. The liquid storage tank according to claim 1, wherein said synthetic polymer material of said membrane is a perfluoro polymer.

15. The liquid storage tank according to claim 1, wherein said synthetic polymer material of said membrane has a plastic characteristic without significant resilient elastic restoring force and with a creep characteristic over time.

16. The liquid storage tank according to claim 1, wherein said spring ring has a diameter and a spring constant selected to match or accommodate a remaining permanent deformation of said synthetic polymer material of said membrane after longterm creep thereof.

17. The liquid storage tank according to claim 1, wherein an outer surface of said spring ring has a roughened surface texture for frictional engagement with said membrane portion of said membrane.

18. The liquid storage tank according to claim 1, wherein said spring ring comprises a coating on a metal substrate, and wherein said spring ring is connected to said portion of said membrane by adhesion or vulcanizing via said coating.

19. The liquid storage tank according to claim 1, wherein said C-shaped cross-section of said spring ring is elastically compressed in said recess, and said spring ring exerts an outwardly directed resilient restoring force onto said membrane portion against said inner surface of said recess.

20. The liquid storage tank according to claim 1, wherein said inner wall surface of said tank wall adjoins said recess along two edges of said recess, and an opening of said recess between said edges is narrower than a dimension of said recess within said recess behind said edges.

* * * * *